United States Patent [19]
Dautartas et al.

[11] Patent Number: 5,768,363
[45] Date of Patent: Jun. 16, 1998

[54] PROGRAMMABLE TIMER CIRCUIT FOR THE SIGNAL GENERATOR OF A COMMUNICATION DEVICE

[75] Inventors: Mindaugas Fernand Dautartas, Alburtis; Steven David Robinson, Lower Macungie Township, Lehigh County, both of Pa.

[73] Assignee: Lucent Technologies Inc., Murray Hill, N.J.

[21] Appl. No.: 660,582

[22] Filed: Jun. 11, 1996

[51] Int. Cl.[6] .................................................. H04M 1/21
[52] U.S. Cl. ........................ 379/375; 379/373; 379/377; 379/418
[58] Field of Search .................... 379/373, 67, 375, 379/199, 88, 102, 82, 350, 372, 386, 418

[56] References Cited

U.S. PATENT DOCUMENTS

| | | | |
|---|---|---|---|
| 4,146,754 | 3/1979 | Rose | 379/102 |
| 4,266,098 | 5/1981 | Novak | 379/77 |
| 4,558,179 | 12/1985 | Bond | 379/70 |
| 4,644,106 | 2/1987 | Yeh | 379/375 |
| 4,791,664 | 12/1988 | Lutz et al. | 379/199 |
| 4,924,499 | 5/1990 | Serby | 379/200 |
| 5,172,408 | 12/1992 | Petty et al. | 379/215 |

OTHER PUBLICATIONS

Patent No. 5,062,134 filed on Sep. 17, 1990 and Issued on Oct. 29, 1991 to Laird. Class: 379/131.

*Primary Examiner*—Krista Zele
*Assistant Examiner*—Scott Wolinsky
*Attorney, Agent, or Firm*—Patricia A. Verlangieri

[57] ABSTRACT

A programmable timer circuit having ON and OFF volume control states; for controlling the volume of audible signals generated by a signal generator of a communication device at preprogrammed times is disclosed. The programmable timer circuit monitors a communication link for the presence of signals indicative of an incoming communication. When such signals are detected and the volume control state of the timer circuit is ON, the volume of the audible signals generated by the signal generator of the communication device is adjusted so that such audible signals are broadcast with a programmed loudness. Volume control of the audible signals generated by the signal generator does not prevent outgoing communications using the communication device. The fact that the volume of the audible signals generated by the signal generator is controlled, is not apparent to the calling party. Incoming calls for which the volume of the audible signals generated by the signal generator have been controlled can be automatically forwarded to a locally connected answering machine. An override feature is provided that allows an audible signal indicative of an incoming call to be generated, even when the timer circuit is ON, if an authorized signal is detected.

6 Claims, 2 Drawing Sheets

PROGRAMMABLE TIMER CIRCUIT FOR THE SIGNAL GENERATOR OF A COMMUNICATION DEVICE

BACKGROUND OF THE INVENTION

1. Field of the Invention

The present invention relates generally to telecommunications equipment and, more particularly, to a programmable timer circuit for controlling the signal generator on a communication device.

2. Description of the Related Art

It can be appreciated that at certain times of the day it is inconvenient and troublesome to answer telephone calls whether at home or at the office. Some people have devised home remedies to eliminate the signaling so as to avoid the disturbance caused by an unwanted telephone call. For example, they have placed the telephone where they could not hear it, set the ringer at its lowest possible volume, or have simply taken the receiver off the hook. The telephone company has also provided an option whereby the telephone installer can set the lowest ringer volume at the time of installation so that the ringing sound is essentially inaudible and may as well be turned off completely.

A major drawback with each of these remedies is that it is always necessary for the user to remember to employ the remedy for silencing the telephone and then remember to reactivate the ringer when incoming calls are desired, since none of the above methods controls the ringer volume automatically. As a result, people either forget to turn the ringer off and thus receive calls at undesirable times or forget to turn the ringer back on and thus miss calls which they are willing to receive.

Another approach directed toward silencing a telephone ringer is based on the ability to control the use of communication equipment with a timer or clock. Such an arrangement is described in U. S. Pat. No. 5,062,134 which discloses an apparatus for monitoring the cumulative time of use for a telephone. The apparatus monitors and times the length of each call placed from or received by the phone and automatically disconnects the communication after a conversation has exceeded a preprogrammed length of time (for example 30 minutes). Additionally, when a cumulative amount of time allotted for the phone to be in use during a 24 hour period has been exceeded, the line is automatically disabled and the phone is rendered inoperable until the beginning of the next 24 hour period (for example 12:01 A M), when the cumulative amount of time allotted for the phone to be in use is reset to zero. Such an arrangement is also not an effective method for silencing a telephone ringer since the ringer is only suppressed, after a cumulative amount of time allotted for the phone to be in use has been exceeded, thus allowing a large number of unwanted calls to be received before the ringer will be silenced, if at all.

SUMMARY OF THE INVENTION

The present invention is directed to a programmable timer circuit for use in conjunction with a communication device. The programmable timer circuit controls the ability of the communication device to announce that an incoming communication has been received, by regulating the volume of the audible signals generated by a signal generator located in the communication device. The volume of the audible signals generated by the signal generator of the communication device are optionally controlled for preprogrammed periods during a 24 hour cycle or for preprogrammed intervals. For example, the timer circuit is programmable to control the volume of the audible signals generated by the signal generator for specific time periods, such as between 11 PM to 6 AM, or for specific time intervals, such as for 30 minute intervals. The timer circuit is optionally programmable to control the volume of the audible signals generated by the signal generator so as to deactivate the signaling ability of the signal generator.

The programmable timer circuit does not interfere with the ability of the communication device to receive incoming calls or to place outgoing calls. Communication devices in which the timer circuit is used include telephone/answering machines, computers or modems. The programmable timer circuit is either incorporated into the individual communication device or used externally. In one embodiment, the external device is inserted immediately after the interface for the incoming telephone service, to control all communication devices on the same line in an office or home.

In one example of the present invention, the programmable timer circuit includes a signal detector which monitors incoming communications for signals indicative of an incoming call. Upon such detection, the programmable timer circuit determines whether a volume control mode for the signal generator is ON\OFF. For example, if the timer circuit has been programmed to control the volume of audible signals generated by the signal generator between 11 PM and 6 AM, and an incoming communication is received at 1 AM, the timer circuit will determine that the volume control mode is ON, and the volume of an audible signal generated by the signal generator is adjusted accordingly. The volume control mode is transparent to a caller initiating an incoming communication. When the volume control mode is ON, an incoming communication is optionally forwarded to an answering machine, computer or other communication device, if available.

An override feature is also provided for those times when the volume control mode is ON. An authorization detector monitors the incoming line for the input of signals other than those indicative of an incoming call that the device has been pre-programmed to recognize. When a signal other than one indicative of an incoming call that the device has been pre-programmed to recognize is detected, the authorization detector overrides the ON state of the programmable timer circuit and the volume of audible signals generated by the communication device's signal generator is restored to a non-programmed state.

Another feature of the present invention is the ability of a user of the communication device to make outgoing calls when the volume control mode of the signal generator is ON.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION

Figure 1:
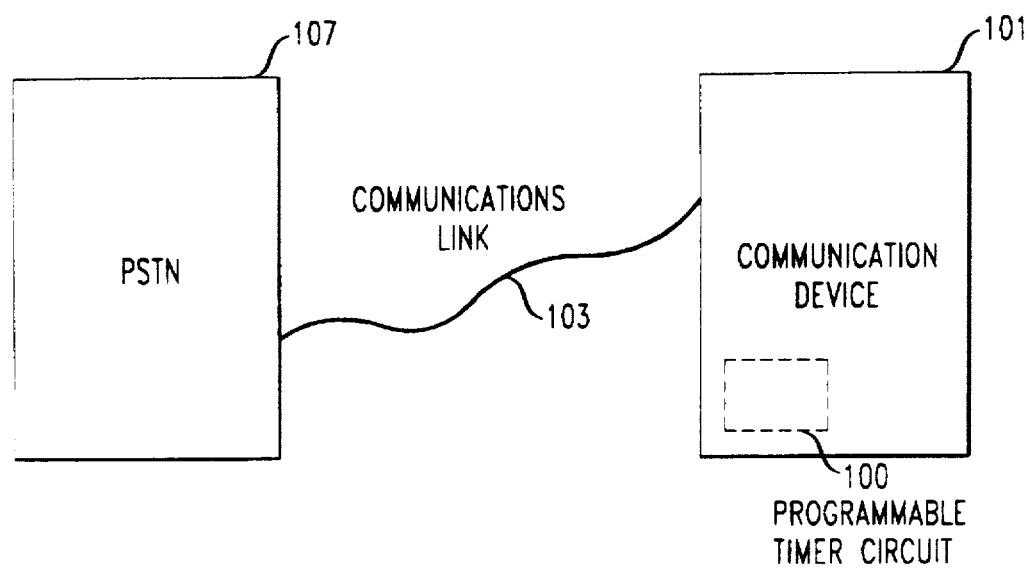
FIG. 1 is a block schematic diagram which indicates an illustrative application of the present invention.

FIG. 1 shows an illustrative application of the present invention wherein communication device 101 including programmable timer circuit 100, capable of selectively controlling the signal functions of the communication device, is connected to a communication link 103. Examples of communication device 101 include a telephone, data terminal equipment, or a modem. Communication link 103 may be of a variety of types including, wire, optical fiber, and/or wireless (cellular and/or noncellular). For purposes of illustration link 103 is part of the public switched telephone network (PSTN) 107 and the remote end (not shown) is assumed to be terminated in a telephone, data terminal equipment or modem. It should be understood, of course, that the present invention is useful with networks other than the public switched telephone network (PSTN), such as, for example, private line networks. Indeed, the present invention is applicable for use in any network which provides a signal to announce the arrival of incoming communications.

Figure 2:
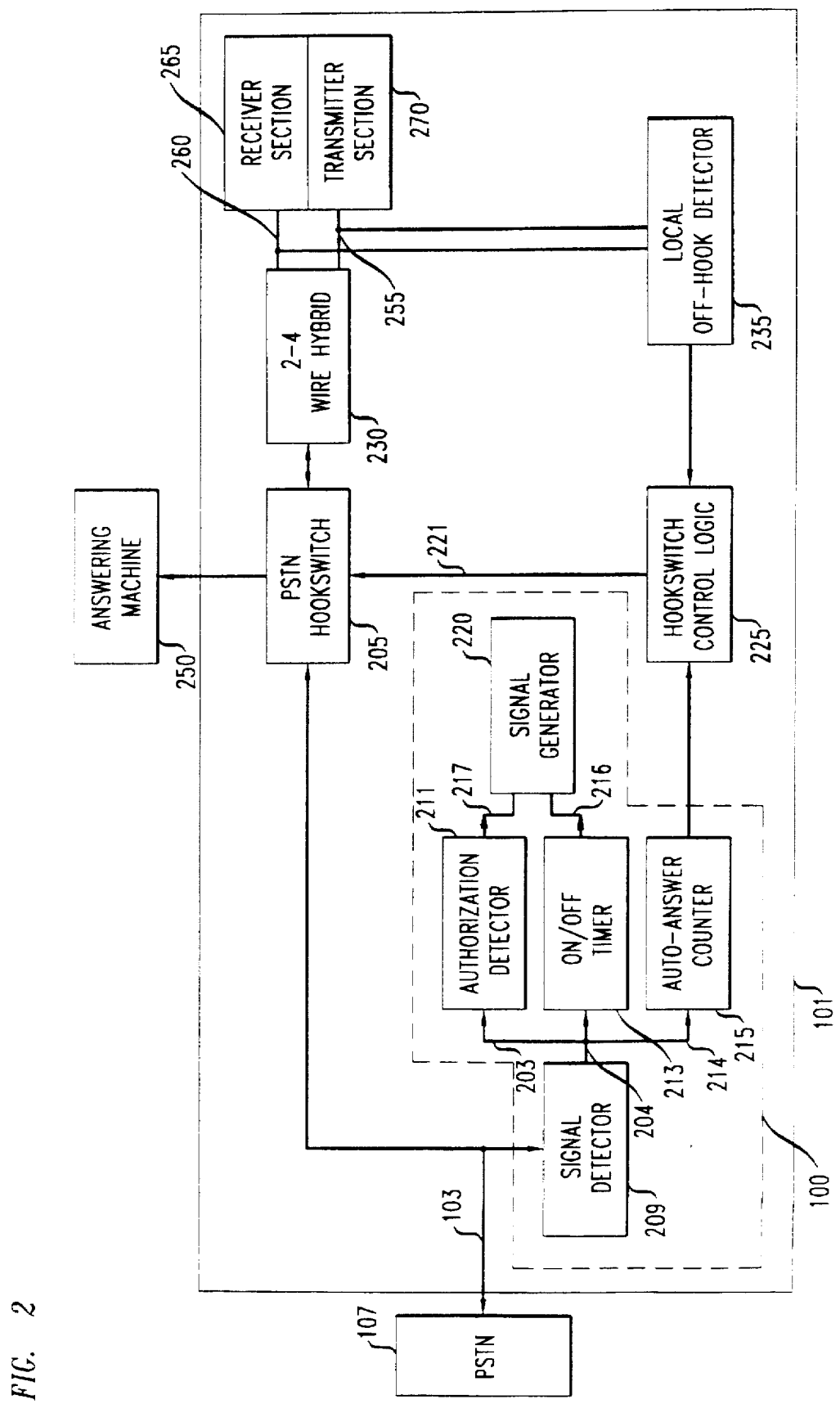
FIG. 2 is a block schematic diagram of a disclosed embodiment of the present invention.

One embodiment of the invention is illustrated in FIG. 2, which shows programmable timer circuit 100 (enclosed with dashed lines), located within communication device 101. Programmable timer circuit 100 is integrated with, but functions independently of, the other component parts of communication device 101. For example, communication device 101 includes additional component parts such as, receiver section 265, transmitter section 270, public switched telephone network (PSTN) hookswitch 205, hookswitch control logic 225, local off-hook detector 235 and 2–4 wire hybrid 230. Such component parts will be discussed in the following explanation of the operation of programmable timer circuit 100.

Circuit 100 includes signal detector 209 which is connected to detect signals transmitted from PSTN 107 over communication link 103. Authorization detector 211 and ON/OFF timer 213 are connected in parallel between signal detector 209 and signal generator 220. The term signal generator as used in this disclosure refers to a component which produces an audible signal which notifies either the communication device, the user of the communication device or both of the arrival of an incoming communication. The signal produced by signal generator 220 is audible. Authorization detector 211 is a signal detector responsive to signals other than those indicative of an incoming call, which are transmitted from the public switched telephone network (PSTN) 107 over communication link 103. ON/OFF timer 213 is a clock/timer which is programmable to control the volume of the audible signals generated by signal generator 220 for specific times (e.g., between 11 PM and 6 AM) or for specific time intervals (e.g., 30 minutes). The ON state of ON/OFF timer 213 is defined as a time interval during which timer 213 has been programmed to control the volume of the audible signals generated by signal generator 220. Signal detector 209 is also connected to auto-answer counter 215. Auto-answer counter 215 monitors and counts the number of signals detected by signal detector 209 which are indicative of an incoming communication.

Signal detector 209 functions to monitor signals received from the public switched telephone network (PSTN) 107 over communication link 103 for the presence of signals indicative of an incoming communication and to transmit control signals indicative of the receipt of such detected signals to authorization detector 211, ON/OFF timer 213 and auto-answer counter 215 via leads 203, 204 and 214, respectively. When signals are detected, indicating that a communication is desired between a remote communication device and communication device 101, ON/OFF timer 213 responds to the detection of received signals by providing a GI (generator indication) signal or a GC (generator controlled) signal to signal generator 220 via lead 216. A GI signal instructs the signal generator to generate an audible signal announcing the arrival of an incoming communication while a GC signal controls the volume of the audible signals generated by signal generator 220. The GI signal is provided to signal generator 220 when a signal indicative of an incoming communication is detected by signal detector 209 and ON/OFF timer 213 is OFF at the time the signal is detected by signal detector 209. The GC signal is provided to control the volume of audible signals generated by signal generator 220 when a signal indicative of an incoming communication is detected by signal detector 209 and ON/OFF timer 213 is ON at the time the signal is detected by signal detector 209.

Signal detector 209 also functions to monitor transmissions received from the public switched telephone network (PSTN) 107 over communication link 103, for the presence of signals other than those that are indicative of an incoming communication. For illustrative purposes signals other than those indicative of an incoming communication may be of a variety of types including, for example, DTMF (dual-tone multifrequency) signals and/or calling tone signals. When a signal other than one indicative of an incoming communication is detected by signal detector 209, authorization detector 211 functions to compare such other signal to preprogrammed signals stored in an internal memory. If the signal other than one indicative of an incoming communication matches a preprogrammed signal stored in the internal memory, authorization detector 211 transmits a GCO (generator control override) signal to signal generator 220 via lead 217. The GCO signal instructs signal generator 220 to override any GC (generator controlled) signal it previously received, and generate the appropriate audible signal to announce the arrival of an incoming communication.

Auto-answer counter 215 functions to make the control of signal generator 220 transparent to callers initiating incoming communications, as well as to automatically forward such communications to a locally connected answering machine 250, data terminal equipment (not shown) or modem (not shown) when the volume control mode of signal generator 220 is ON. Auto-answer counter 215 is connected between signal detector 209 and hookswitch control logic 225. Hookswitch control logic 225 functions to control the operation of public switched telephone network (PSTN) hookswitch 205, so that incoming communications and outgoing communications are appropriately forwarded to either receiver section 265 or transmitter section 270 of communication device 101, or a predetermined destination such as, for example, answering machine 250, data terminal equipment (not shown), or a modem (not shown).

Auto-answer counter 215 instructs hookswitch control logic 225 to forward an incoming call through PSTN hookswitch 205 when a predetermined number of signals indicative of an incoming communication have been detected by signal detector 209. Auto-answer counter 215 includes two internal registers. In a first programmable register a predetermined signal count is stored. In a second register an incremental signal count is indexed. The predetermined signal count contained in the first register is programmable by an operator of the communication device 101 and is equal to the number of signals indicative of an incoming communication an operator wants to be detected by signal detector 209, before the communication is automatically forwarded through PSTN hookswitch 205 to a predetermined destination, such as answering machine 250. The signal count in the incremental register is initially set to zero and is incremented by control signals transmitted via lead 214 which are generated each time signal detector 209 detects the presence of signals indicative of an incoming communication on link 103. Every time the count in the incremental register is increased by one count, it is compared to the predetermined count in the first register. When the counts in each of these two registers are equivalent, auto-answer counter 215 resets the count in the incremental register to zero and notifies hookswitch control logic 225 to instruct public switched telephone network (PSTN) hookswitch 205 to forward the communication to a predetermined destination, such as, for example, answering machine 250.

Auto-answer counter 215 alternatively resets the internal incremental second register to zero, when notified by hookswitch control logic 225 of an off-hook state. For example, off-hook detector 235 will notify hookswitch control logic 225 of an off-hook state when an operator of communication device 101 has activated receiver section 265, in response to signals announcing the arrival of an incoming communication.

As an illustrative example of the operation of auto-answer counter 215, assume the predetermined count in the first register is set to five by an operator of the communication device. Upon the detection by signal detector 209 of a signal indicative of an incoming communication, a control signal is transmitted to the incremental second register of auto-answer counter 215 instructing it to increment by one count and compare this number to the value stored in the first register to determine if they are equal. The indexing of the second incremental register and its comparison to the first programmable register occurs for each signal indicative of an incoming communication, detected by signal detector 209. When the number of counts contained in the incremental register is equal to the predetermined number stored in the first register (five, for the above example), auto-answer counter 215 resets the incremental register to zero and notifies hookswitch control logic 225 to forward the call through PSTN hookswitch 205 to answering machine 250.

The incorporation of auto-answer counter 215 in programmable timer circuit 100 advantageously provides a time interval for authorization detector 211 to override a volume control mode for signal generator 220. With respect to the illustrative example discussed above, once signal detector 209 detects the first signal indicative of an incoming communication, a time interval occurs before the incoming communication is automatically forwarded to answering machine 250. For example, if the programmable first register contains the value five, the time interval to override a volume control mode for signal generator 220 is equivalent to the time needed for the incremental second register to index five counts. Thus, according to this example, authorization detector 211 will have a time delay equivalent to the amount of time necessary for the incremental second register of auto-answer counter 215 to index five counts, within which to detect and authenticate an authorized override signal, before the incoming communication is automatically forwarded to answering machine 250.

Auto-answer counter 215 is optionally programmable so that counter 215 will notify control logic 225 to instruct PSTN hookswitch 205 to automatically forward the incoming communication to answering machine 250 upon detection of the first signal indicative of an incoming communication received by signal detector 209.

The volume control mode of signal generator 220 does not affect the ability to initiate outgoing calls utilizing communication device 101. In that regard, public switched telephone network (PSTN) hookswitch 205 is also coupled to receiver section 265 and transmitter section 270 of communication device 101, between communication link 103 and conventional 2-4 wire hybrid 230. The state of hookswitch 205 is controlled by signals provided by hookswitch control logic 225 via lead 221. Such hookswitch control logic is well known and in the past has been responsive to the detection of ringing signals received from a communication link. Now, in accordance with one illustrative embodiment, hookswitch control logic 225 is responsive to auto-answer counter 215 (as previously discussed) and local off-hook detector 235. Local off-hook detector 235 monitors the off-hook state of receiver section 265 and transmitter section 270 of communication device 101 via leads 255 and 260, respectively. Local off-hook detector 235 instructs hookswitch logic control 225 to place PSTN hookswitch 205 in an off-hook state to couple incoming communications to the receiver section 265 or to provide outgoing service from the transmitter section 270 of communication device 101. 2-4 wire hybrid 230 functions in well known fashion to couple incoming or received signals via communication link 103 to receiver section 265 of communication device 101. In the opposite direction, assuming PSTN hookswitch 205 is in an off-hook state, hybrid 230 couples transmitted signals from transmitter section 270 of communication device 101 through PSTN hookswitch 205 to communication link 103.

It should, of course, be understood that while the present invention has been described in reference to an illustrative embodiment, other arrangements may be apparent to those of ordinary skill in the art. For example, while the disclosed embodiment utilizes descrete devices, these devices can be implemented using one or more appropriately programmed, general purpose processors or special-purpose integrated circuits or digital processors or an analog or hybrid counterpart of any of these devices. Or, for example, while in the disclosed embodiment, apparatus is added to a telephone/answering machine, this apparatus could be disposed in an adjunct which interfaces with this type of communication device.

The invention claimed is:

1. A circuit for selectively controlling the signalling functions of a signal generator located within a communication device, comprising:

a first signal detector coupled to a communication link for detecting the presence of signals indicative of an incoming communication on said communication link;

a programmable timer having an input and an output, said input coupled to said first signal detector and said output coupled to a signal generator, wherein said programmable timer is programmed between a first state, in which said programmable timer transmits a first instruct signal via said output to said signal generator in response to receiving a control signal from said first signal detector, said first instruct signal instructing said signal generator to generate signals having a specified volume, and a second state, in which said programmable timer transmits a second instruct signal via said output to said signal generator, said second instruct signal instructing said signal generator to generate signals without specifying a volume; and a counter coupled to said first signal detector, wherein said counter forwards said incoming communication to a predetermined location within the communication device, upon counting a prescribed number of signals indicative of said incoming communication, if said programmable timer is in said first state.

2. The circuit of claim 1, further comprising a second signal detector, coupled in parallel with said programmable timer, between said first signal detector and said signal generator, wherein said second signal detector detects signals other than said signals indicative of said incoming communication, compares said other detected signals with a plurality of predetermined signals and instructs said signal generator to generate a signal announcing the arrival of said incoming communication, if said other detected signals correspond to one of said plurality of predetermined signals.

3. The circuit of claim 2, wherein said signals other than said signals indicative of said incoming communication are one of the group consisting of calling tone signals and dual-tone multifrequency (DTMF) signals.

4. The circuit of claim 1, wherein said communication device is one of the group consisting of a telephone, data terminal equipment, and a modem.

5. A method for selectively controlling the signalling functions of a signal generator located within a communication device, comprising the steps of:

detecting the presence of signals indicative of an incoming communication on a communication link;

determining whether to activate a signal generator to indicate the presence of said incoming communication in response to a programmable timer, said programmable timer having an input and an output, said input coupled to a first signal detector and said output coupled to a signal generator, wherein said programmable timer transmits first state, in which said programmable timer transmits a first instruct signal via said output to said signal generator in response to receiving a control signal from said first signal detector, said first instruct signal instructing said signal generator to generate signals having a specified volume, and a second state, in which said programmable timer transmits a second instruct signal via said output to said signal generator, said second instruct signal instructing said signal generator to generate signals without specifying a volume; and forwarding said incoming communication to a predetermined location within said communication device, upon counting a prescribed number of signals indicative of said incoming communication, if said programmable timer is in said first state.

6. The method of claim 5, further comprising the step of detecting the presence of a signal other then said signal indicative of an incoming communication on said communication link, comparing said other detected signal with a plurality of predetermined signals, and instructing said signal generator to generate a signal announcing the arrival of an incoming communication, if said other detected signal corresponds to one of said plurality of predetermined signals.

* * * * *